United States Patent [19]
Carlsson

[11] 4,324,134
[45] Apr. 13, 1982

[54] MOTOR TEST STAND
[75] Inventor: Kurt I. Carlsson, Brastad, Sweden
[73] Assignee: Jonsereds Aktiebolag, Partille, Sweden
[21] Appl. No.: 157,489
[22] Filed: Jun. 9, 1980
[51] Int. Cl.³ .............................................. G01L 5/00
[52] U.S. Cl. .................................. 73/117.1; 73/862.15
[58] Field of Search ............. 73/117.1, 862.14, 862.15, 73/862.16; 188/270

[56] References Cited
U.S. PATENT DOCUMENTS
1,483,075  2/1924  Chilton ................................ 188/270

*Primary Examiner*—Jerry W. Myracle
*Attorney, Agent, or Firm*—Alfred E. Miller

[57] ABSTRACT

A test stand for internal combustion motors, is constructed to provide an optional test load for the motor. The motor is connected to an axle by a connecting member at one end of the axle mounted in the test stand. The opposite end of the axle is connected to a brake rotor having brake members in the form of ropes or strips affixed to its periphery. When the brake rotor with its brake members is rotated, friction arises between the brake members and the ambient air or gas. This friction provides the desired test load for the motor via the brake rotor and the axle.

14 Claims, 4 Drawing Figures

MOTOR TEST STAND

BACKGROUND OF THE INVENTION

The present invention refers to a test stand for motors, especially for motor saws and the like, for providing an optional test load of the motor.

When servicing and repairing internal combustion motors, e.g. for motor saws, power lawn mowers and the like, it is often necessary to make certain adjustments of e.g. the carburetor and the ignition system, when the motor is working and is loaded. In order to simulate actual operation conditions the motor can be loaded in different ways. This is usually done by the use of so-called test stands, to which the driving axles of the motors are coupled.

The most frequent test stands are of the kind where the test load is loaded by magnetic brakes or water brakes. In these types of test stands permanent magnets, electromagnets or impellers, respectively, are used as retarding or braking elements. Strap brakes and disc brakes having brake straps and brake discs as retarding elements are also used. These previously known test stands require many parts and are therefore complicated and require extensive maintenance. For this reason the test stands are expensive to manufacture and to operate.

SUMMARY OF THE INVENTION

The present invention is directed to overcoming the above-mentioned drawbacks, and to provide a simple and inexpensive test stand, which is easy to handle and requires very little maintenance. According to the invention, this is achieved by mounting an axle in a stand. A coupling member, to which the motor can be detachably connected, is affixed to one end of the axle. A brake rotor is mounted on the opposite end of said axle. A plurality of brake members are affixed to the periphery of the brake rotor. The brake members comprise flexible ropes, strips or the like of plastic, and are detachably affixed to the periphery of said brake rotor, for providing brake action by friction against the ambient air or gas.

DESCRIPTION OF THE DRAWINGS

An embodiment of the invention will now be further described with reference to the accompanying drawings, wherein.

DESCRIPTION OF AN EMBODIMENT OF THE INVENTION

Figure 1:
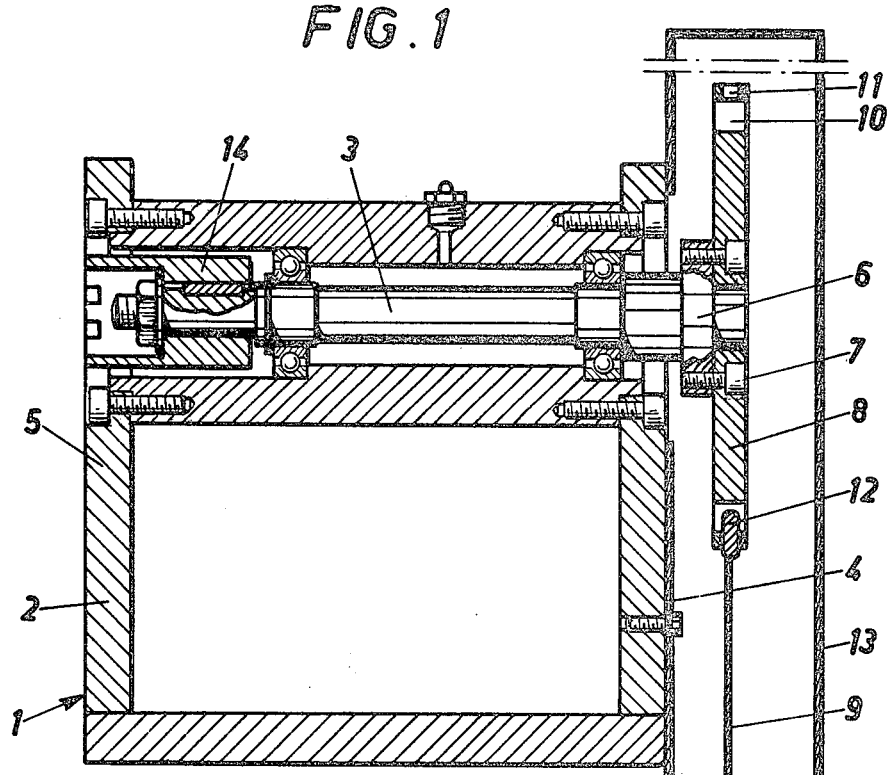
FIG. 1 is a vertical longitudinal cross-sectional view of a test stand according to the invention.
Figure 2:
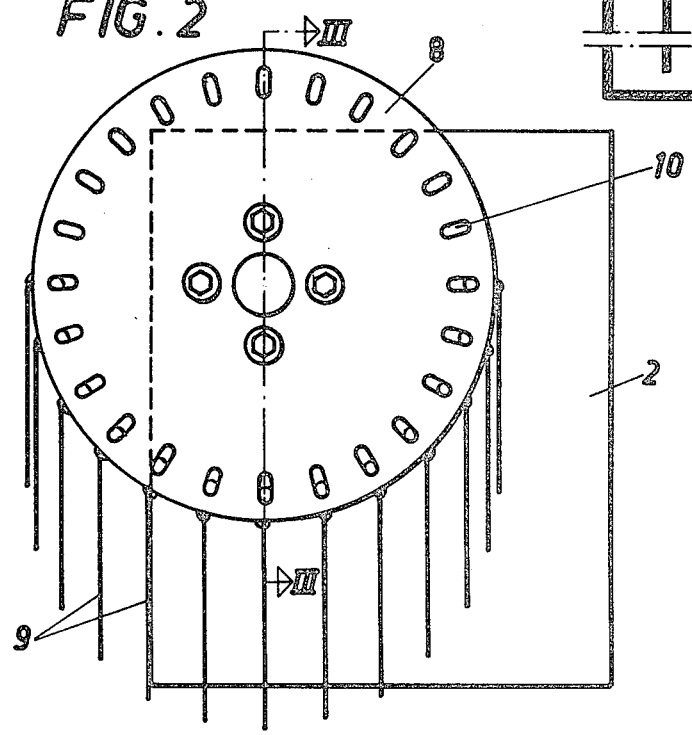
FIG. 2 is a front view of the brake rotor.

Referring now to FIG. 1, the test stand 1 comprises three main parts, viz. a box-shaped stand 1, which is preferably mounted on a work bench (not shown), an axle 3 mounted in the stand 2 and a brake rotor 8.

Figure 3:
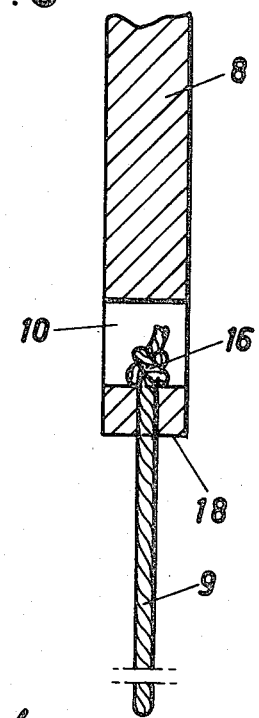
FIG. 3 is a partial cross-sectional view of a part of the brake rotor of FIG. 2, showing the arrangement of one brake member clearly.

The box-shaped stand 2 is preferably made of metal. The axle 3, which is mounted at two locations in the stand, extends essentially through the entire upper part of the stand 2, i.e. from the side 4 of the stand 2 to the back side 5 thereof. One of the end portions of the axle 3 projects somewhat beyond the front side 4 of the stand 2 and a circular mounting plate 6 is affixed to this extension. The mounting plate 6 has a diameter approximately twice the diameter of the axle 3. A plurality of threaded holes are provided in this mounting plate 6 for receiving mounting screws 7. A circular rotational symmetrical brake rotor 8 is attached to the mounting plate 6 of the axis 3 by means of said screws 7 and thus rotates synchronously with the axle 3 during operation. Mounting holes for brake members 9 are provided adjacent the periphery of the brake rotor. The mounting holes each include an axial through hole 10 close to the periphery of the brake rotor 8 and a radial hole 11 with a somewhat smaller diameter and extending from the middle portion of the axial hole to the periphery of the brake rotor. This radial hole 11 forms a connection between the axial hole 10 and the periphery 18 of the brake rotor and forms a mounting hole for the brake members 9. The brake members 9 are preferably flexible plastic of glass fiber ropes, and are provided with mounting members 12 at their mounting ends which are mounted in the mounting holes 10 and 11. The mounting members 12 can e.g. consist of a metal element pressed onto the rope or simply a knot 16 (FIG. 3) at the end of the brake member. Such a brake member 9 is easy to mount and to dismount, so that varying test loads for the motor can easily be obtained. The test load of the motor is varied by changing the number and/or the length of the brake members. The lengths of the brake members 9 are changed simply by cutting off or trimming the ropes to such a length that the desired test load for the motor is provided.

The test load of the motor is proportional to the rotational speed of the brake rotor 8, the length, diameter and weight of the brake members 9 and the attachment diameter of the brake rotor 8. The attachment diameter is the diameter defined at the points of attachment of the brake members 9 to the brake rotor 8.

The brake rotor 8 and the brake members 9 are preferably enclosed in a protective housing 13, so dimensioned that the brake rotor 8 and the brake members 9 mounted thereto can rotate unobstructedly within the protective housing 13. The protective housing is preferably fixed to the stand 2.

A coupling 14 is arranged at the opposite end portion of the axle 3. The coupling 14 is designed so that the motors of most types of motor saws easily can be connected to the test stand 1.

In operation, when the test stand is to be used, the crankshaft (not shown) of the motor of a motor saw is connected to the axle 3 of the test stand 1 via the coupling 14. The axle 3 and the brake rotor 8 are thereby rotated synchronously with the crankshaft of the motor saw. The brake members 9 mounted at the periphery of the brake rotor 8 are, upon the rotation of the brake rotor 8, rapidly rotated in the air or gas volume in the protective housing 13. During the rotation, friction will arise between the brake members 9 and the air or gas molecules. This friction provides a braking moment on the brake rotor 8 and the motor saw connected thereto. The friction between the air or other gas and the brake members 9 increases as the speed of the brake rotor is increased.

It is not desirable to adjust the rotation speed of the saw motor or internal combustion motor in order to achieve the desired load. It is therefore preferred that the length of the brake members 9 be adjusted so that the right friction and test load for the motor are obtained. As the length of the brake members 9 is increased the peripheral speed at the outer ends of the brake members 9 will also increase and thus the friction against the ambient air or other gas will increase.

If a motor (not shown) with a low rotation speed is connected to the test stand according to the invention, a stepup gear (not shown) can be arranged e.g. between the motor and the test stand. Adequate rotational speed of the brake rotor for generating a braking moment can be achieved by the technique.

Figure 4:
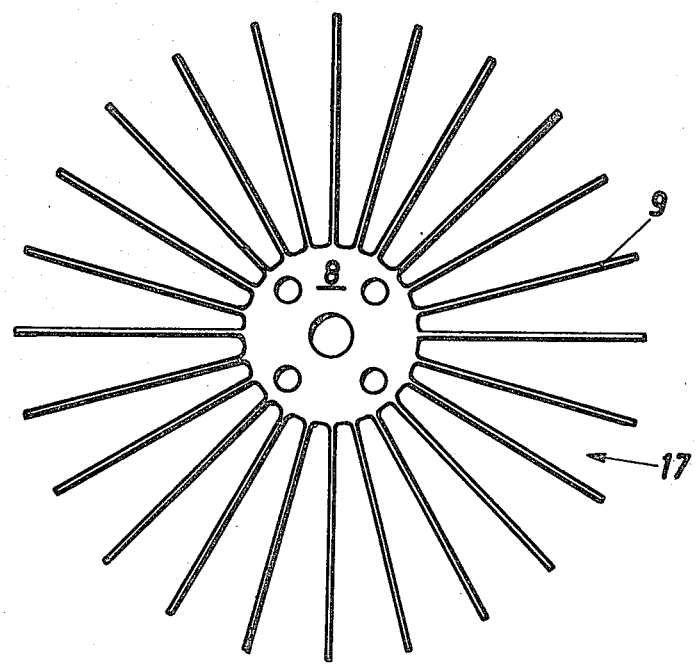
FIG. 4 is a view of an alternative brake rotor molded in one single piece.

Instead of using a brake rotor 8 having detachable brake members 9, e.g. ropes, it is of course possible to use a brake rotor 17, in which the brake members 9 are integral with the brake rotor 8. A brake rotor 17 of this type is preferably made in one single piece, e.g. of plastic, as shown in FIG. 4. The brake rotor 17 can be mounted directly on the axle 3 with screws, in the same way as in the previously described brake rotor 9, but can also be provided with a simple conventional quick-coupling. Such a coupling can e.g. be obtained by providing a threaded shaft (not shown) extending through the brake rotor 17 on the end of the axle 3. The brake rotor is positioned on this threaded shaft at the time of assembly. A wing nut can be used as the locking means.

The invention is of course not limited to the above described embodiments but many alternative embodiments also are within the scope of the invention. Thus, the test stand according to the invention can easily be modified for use as a brake device for vehicle wheels, e.g. via a gear assembly.

What is claimed is:

1. A test stand for motors, comprising a stand, an axle rotatably mounted in said stand, coupling means on said axle for coupling said axle for rotation to a motor, a brake rotor mounted for rotation to said axle, and a plurality of flexible brake elements mounted on said rotor at the periphery thereof, said brake elements comprising elongated members.

2. The test stand of claim 1 comprising a pair of mounting means for rotatably affixing said axle to said stand at two locations, said coupling means being affixed to one end of said rotor, and said rotor being affixed to the other end of said axle.

3. The test stand of claim 2 wherein said brake elements are detachably affixed at the periphery of said rotor.

4. The test stand of claim 3 wherein said brake elements have enlarged ends and are fitted into holes in the periphery of said rotor.

5. The test stand of claim 3 wherein said brake elements are ropes.

6. The test stand of claim 3 wherein said brake elements are plastic strips.

7. The test stand of claim 2 wherein said rotor and brake elements comprise a unitary plastic element, said brake elements comprising plastic fingers extending radially from the outer periphery of said rotor.

8. The test stand of claim 1 wherein said brake rotor is detachably affixed to said axle.

9. The test stand of claim 1 further comprising a housing enclosing said rotor and brake elements, said housing being air or another gas filled, whereby friction is created between said brake elements and said air or gas upon rotation of said rotor in said housing.

10. In a test stand for a motor wherein a shaft is mounted for rotation with the shaft of a motor, and a brake means is mounted on the shaft of the test stand for rotation in a gas or air, whereby friction is created between said brake means and the surrounding gas or air; the improvement wherein said brake means comprises a central brake rotor mounted on said shaft, and a plurality of flexible brake elements affixed to said brake rotor and distributed about the outer periphery thereof.

11. The test stand of claim 10 wherein said brake rotor is disc-shaped and has a plurality of axially extending holes therethrough distributed adjacent the outer periphery thereof, and a radially extending hole from said outer periphery to each of said axially extending holes, each brake element extending through a separate said radially extending hole and into the corresponding said axially extending hole and having an enlarged end in said axially extending hole, whereby said brake elements are removable from said brake rotor.

12. The test stand of claim 11 wherein said brake elements are of rope.

13. In a test stand for a motor wherein a shaft is mounted for rotation with the shaft of a motor, and a brake means is mounted on the shaft of the test stand for rotation in a gas or air, whereby friction is created between said brake means and the surrounding gas or air; the improvement wherein said brake means comprises a brake rotor mounted on said shaft, said brake rotor being of a plastic material and having a plurality of flexible plastic fingers extending radially from the outer periphery of a central rotor portion.

14. The test stand of claim 13 wherein said plastic fingers are integrally formed with the rotor of said brake means.

* * * * *